(12) United States Patent
Mumm

(10) Patent No.: US 7,600,726 B2
(45) Date of Patent: Oct. 13, 2009

(54) DEVICE FOR LIFTING AND ROTATING CONTAINERS

(75) Inventor: Hans W. Mumm, Soerup (DE)

(73) Assignee: Atec Pharmatechnik GmbH, Soerup (DE)

( * ) Notice: Subject to any disclaimer, the term of this patent is extended or adjusted under 35 U.S.C. 154(b) by 253 days.

(21) Appl. No.: 11/524,872

(22) Filed: Sep. 22, 2006

(65) Prior Publication Data

US 2007/0069087 A1      Mar. 29, 2007

(30) Foreign Application Priority Data

Sep. 29, 2005   (DE) ........................ 10 2005 046 838

(51) Int. Cl.
*A47F 5/12* (2006.01)
(52) U.S. Cl. .................... 248/133; 248/135; 248/137
(58) Field of Classification Search ............... 248/133, 248/135, 137, 138, 140, 142, 144, 917
See application file for complete search history.

(56) References Cited

U.S. PATENT DOCUMENTS

| | | | | |
|---|---|---|---|---|
| 4,862,932 | A * | 9/1989 | Feinstein et al. ............ | 141/130 |
| 4,922,782 | A * | 5/1990 | Kawai ...................... | 74/490.03 |
| 5,005,364 | A * | 4/1991 | Nelson ......................... | 62/76 |
| 5,279,192 | A * | 1/1994 | Hartman ..................... | 82/112 |
| 5,293,107 | A | 3/1994 | Akeel | |
| 5,309,959 | A * | 5/1994 | Shaw et al. ................. | 141/130 |
| 5,421,626 | A | 6/1995 | Glachet | |
| 5,890,880 | A * | 4/1999 | Lustwerk ................... | 417/366 |
| 6,659,115 | B1 | 12/2003 | Wieczorek | |
| 6,835,362 | B1 | 12/2004 | Eriksson | |
| 7,121,514 | B2 * | 10/2006 | Twyford ................... | 248/177.1 |
| 2002/0092816 | A1 * | 7/2002 | Kim ........................ | 211/85.13 |
| 2003/0040841 | A1 | 2/2003 | Nasr et al. | |
| 2003/0114961 | A1 | 6/2003 | Riff et al. | |
| 2008/0197256 | A1 * | 8/2008 | Hirschhorn .............. | 248/276.1 |

FOREIGN PATENT DOCUMENTS

| | | |
|---|---|---|
| DE | 93 00 391 | 8/1993 |
| DE | 199 16 720 | 10/2000 |
| EP | 0 586 307 | 3/1994 |
| EP | 1 449 543 | 8/2004 |
| EP | 1 510 227 | 3/2005 |
| WO | WO 02/086637 | 10/2002 |

OTHER PUBLICATIONS

Servolift GmbH, "Handlingsysteme", http://www.servolift.de, Sep. 26, 2005.
Nybergs Maskin AB, "Nybergs Hoist", http://www.nybergs.com/eng/produktfonster.htm, Sep. 26, 2005.

* cited by examiner

*Primary Examiner*—Amy J. Sterling
(74) *Attorney, Agent, or Firm*—Roylance, Abrams, Berdo & Goodman, L.L.P.

(57) ABSTRACT

A device for lifting and rotating containers in a clean room environment, includes a stationary support column, a mounting for receiving a container, and an articulated arm for connecting the mounting to the support column. The mounting may be moved up and down in relation to the support column and may be moved about a horizontal axis. At least one articulated arm is disposed between the mounting and the support column that pivots in relation to the support column about a horizontal axis away from an axis of rotation of the mounting.

6 Claims, 8 Drawing Sheets

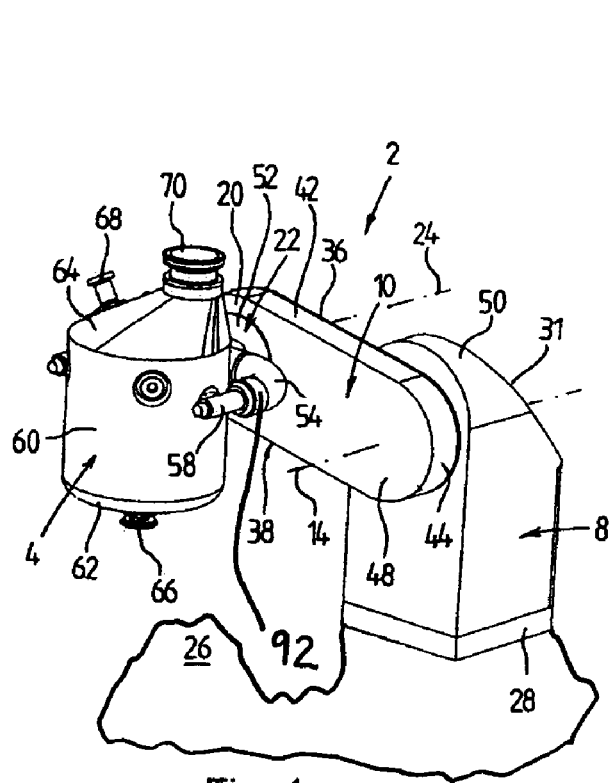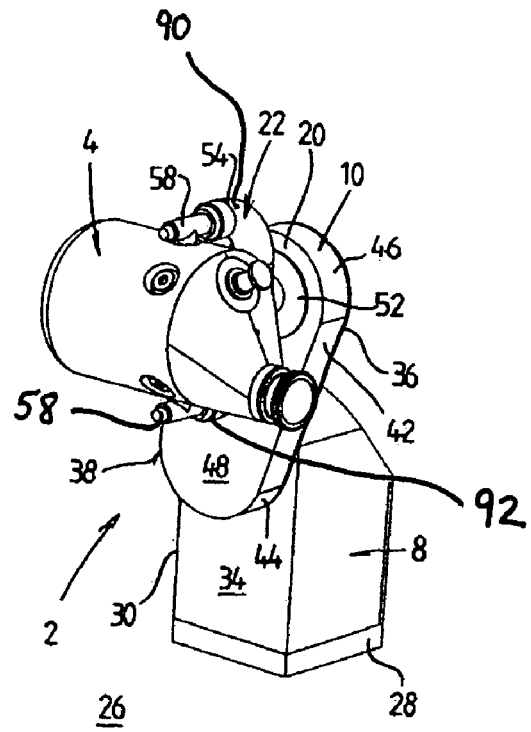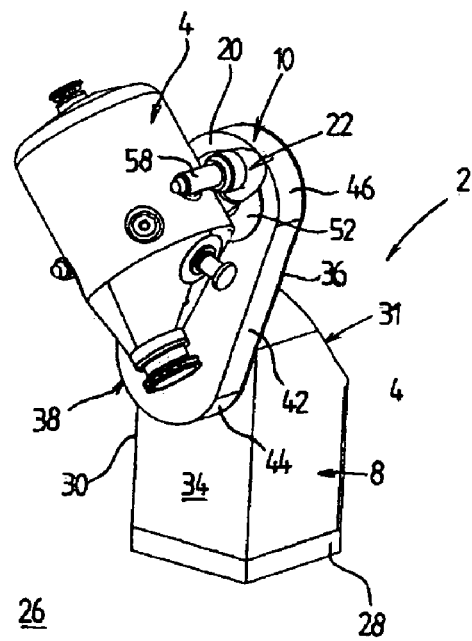
Fig. 1a
Fig. 1b
Fig. 1c

DEVICE FOR LIFTING AND ROTATING CONTAINERS

CROSS-REFERENCE TO RELATED APPLICATION

This application claims the benefit under 35 U.S.C. § 119, of German Patent Application No. 10 2005 046 838.8, filed Sep. 29, 2005, which is hereby incorporated by reference in its entirety.

FIELD OF THE INVENTION

The present invention relates to a device for lifting and rotating containers in a clean room environment, the device having a stationary support column and a mounting for receiving the containers. The mounting may be moved up and down in relation to the support column and is rotatable about a horizontal axis. More particularly, the invention also comprises at least one articulated arm pivotably disposed between the support column and the mounting to transport the container around the support column.

BACKGROUND OF THE INVENTION

SERVOLIFT GmbH company markets a container lifting column (Behälter-Hubsäule) that vertically lifts the container by means of a hydraulic cylinder mounted in the interior of the lifting column and rotates about the horizontal axis of rotation by means of a hydraulic rotating drive of the mounting. On the side adjacent to that of the mounting, the lifting column is fastened by a flexible cover which must be lifted at the level of a connecting element between the hydraulic cylinder and the mounting in order to provide a wall opening for the connecting element also moved in lifting or lowering of the mounting. A wall opening such as this is, however, highly unfavorable for clean room considerations, since it does not permit sufficient gas-tight and liquid-tight sealing.

A similar lift device for clean room environments, under the name "Nyberg Hoist," is marketed by the Nybergs Maskin AB company, Falun, Sweden.

DE 199 16 720 A1 also discloses a lift device designed as a transfer cart for clean room environments for containers with no rotatable mounting. The disclosed lift device has a lifting column which is surrounded by a bellows; this is also highly unfavorable from the clean room viewpoint because of the flexible material and the many surfaces of the bellows.

Accordingly, a need exists for providing a unique and improved device for lifting and rotating containers in a clean room environment with an articulated arm pivotable in relation to its support about a horizontal axis.

SUMMARY OF THE INVENTION

Accordingly, an object of the invention is to provide a device for lifting and rotating containers to ensure effective sealing of the device in a clean room environment.

Another object is to provide a device having a mounting between a support column and the container where the mounting has at least one articulated arm which may be pivoted in relation to the support column about a horizontal pivot axis located a distance from the mounting's axis of rotation.

A further object is to provide a device for rotating the container or the mounting and for lifting or lowering the container or the mounting by rotating or pivoting at least one articulated arm, utilizing a hinge joint for the rotation or pivoting rather than sealing off a wall opening from a clean room environment.

Yet another object is to provide a device for lifting, or lowering, and rotating a container using the same drives, preferably rotating drives.

Still another object is to provide a device having rotating drives which may be sealed off from the clean room environment inside a support column, or an articulated arm, and may be designed uniformly for simplifying maintenance and reducing the number of structural components.

Still another object of the invention is to provide a device having two articulated arms disposed between a support column and a mounting wherein the second articulated arm is pivotable in relation to the first articulated arm by means of an electric drive motor of a rotating drive mounted in the first articulated arm and acts on the second articulated arm through a reduction gear.

Another object of the invention is to provide a device for lifting and rotating containers in a clean room environment where the device may be covered entirely with stainless steel plates.

In a first exemplary embodiment, still another object is to provide a single articulated arm connected at one of its ends to the support column by a first hinge joint and on its opposite end supports the mounting rotatably connected to the articulated arm.

In a second exemplary embodiment, another object is to provide a device with greater range and more degrees of freedom of rotating the mounting and articulated arm assembly. This is done by providing a first and a second articulated arm mounted between the support column and the mounting, of which the first articulated arm is connected at one of its ends by a first hinged joint to the support column and at its opposite end by a second hinged joint to the second articulated arm. The second articulated arm supports a mounting on its free end, which is rotatably connected to the second articulated arm by way of a third hinged joint.

As used in this application, the terms "top", "bottom", and "side" are intended to facilitate the description of the device for rotating and lifting containers, and are not intended to limit the device of the present invention to any particular orientation.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure:

FIGS. 1a, b, and c are front, perspective views of the device for lifting and rotating containers illustrating a container received, lifted, and rotated by the device;

DETAILED DESCRIPTION OF THE INVENTION

As seen in FIGS. 1a-1c, the device 2 shown may be used in clean room environments for lifting, lowering, and/or rotating heavy containers. This is important in the pharmaceutical industry, for example, where containers for washing, sterilization and/or transport of small objects, such as syringe parts, vials for pharmaceutical purposes or stoppers of infusion flasks have to be lifted and rotated for treating the object inside the containers and/or for emptying the containers or where heavy containers with liquids or powders have to be lifted and rotated for emptying the containers without any contamination of the clean room environment by grease, oil or any other pollutant escaping from lubricated or contaminated parts in the interior of the device 2. As shown in FIGS. 1a-c and 5a-c, and previously described in EP 1 510 227 A1 or EP 1 449 543 A1 (issued to the applicant), the device 2 docks a container 4 for handling and conveying small objects such as plungers for syringes, vials for pharmaceutical purposes, or stoppers of infusion flasks, to a treatment station or a delivery station 6 (FIGS. 5a to c) for emptying the containers 4 or removal from the station 6 for depositing the containers 4 on a transfer cart, for example. The device 2 may also be used to fill and/or empty drums or other rigid containers holding active ingredients or chemicals.

Figure 2A:
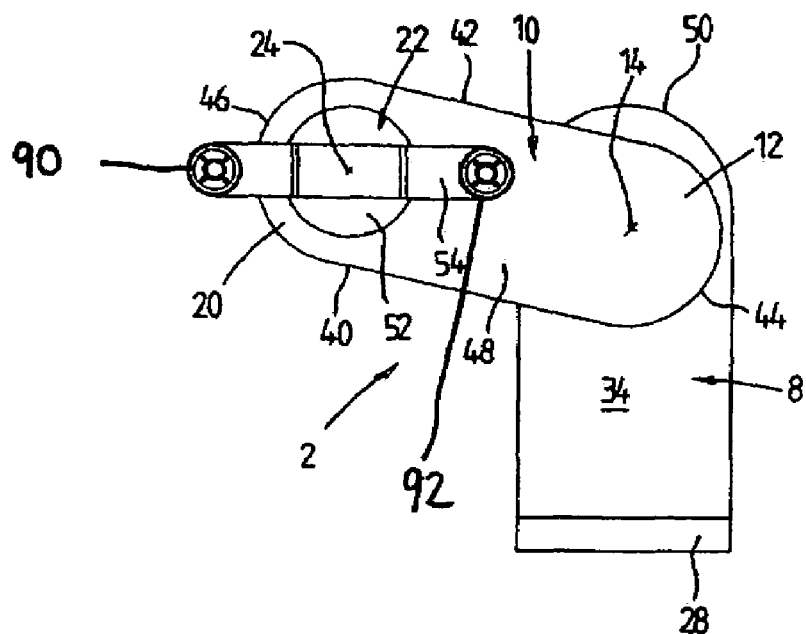
FIGS. 2a and b are front perspective views of the device shown in FIGS. 1a-1c without the container.
Figure 2B:
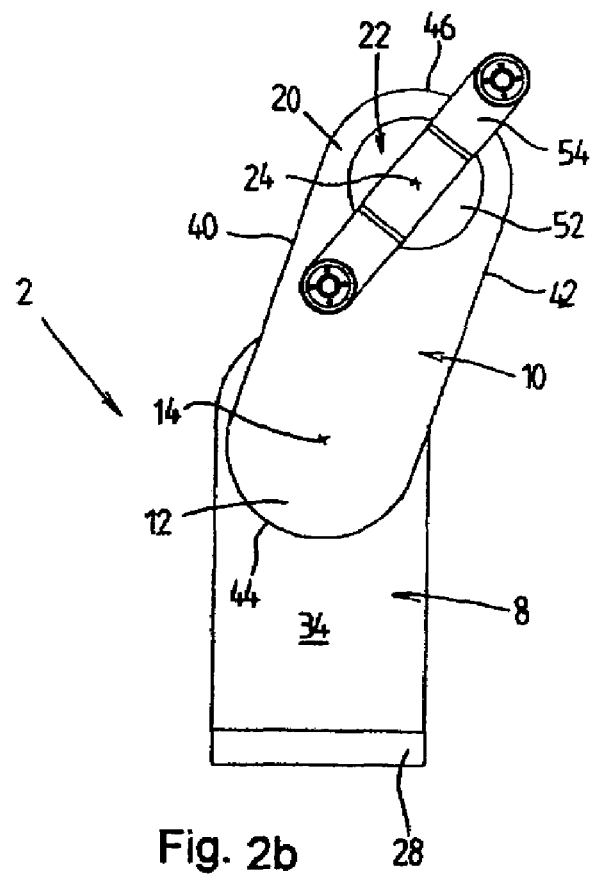
Figure 3:
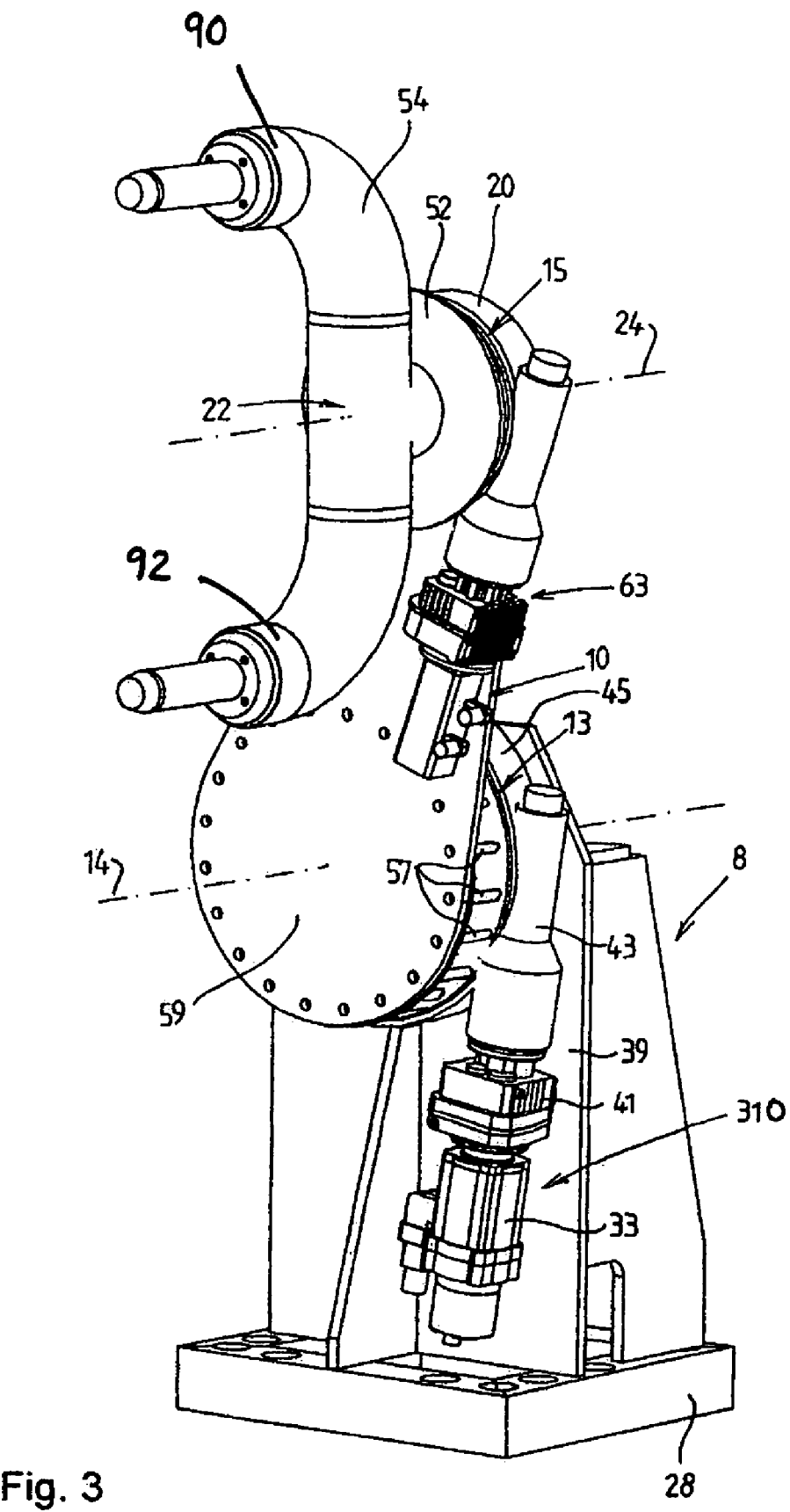
FIG. 3 is a front perspective view of the device shown in FIGS. 1-2b with the boundary walls removed.

As shown in FIGS. 2a-3, the device 2 comprises a support column 8, a single articulated arm 10, and a mounting 22. A first end 12 of the articulated arm 10 is pivotably connected to the support column 8 by way of a hinge joint 13, such as a rotary joint, and pivots about a horizontal axis 14. A second front end 20 supports a mounting 22 which is connected by a suitable hinge joint 15, such as a rotary joint, to the articulated arm 10 so as to pivotable about a horizontal pivot axis 24 or moved up and down relative to the support column 8. Mounting 22 receives container 4 and transports it to delivery station 6.

Support column 8 is substantially square in cross-section below its point of contact with the articulated arm 10. In the exemplary embodiment illustrated, it is rigidly connected to a floor 26 of the clean room. It is further supported by a base plate 28 substantially similarly shaped as the lowermost portion of the support column 8. The base plate 28 is mounted on the floor 26. Alternatively, the support column 8 may be substantially circular in cross-section. The cross section of support column 8 does not have to be uniformly shaped throughout.

The mounting 22 for receiving containers 4 comprising a round mounting plate 52 and a mounting fork 54 for gripping containers 4, with two parallel fork arms 90, 92. The parallel fork arms 90, 92 project above mounting plate 52 may be introduced into two complementary seating sockets 58 of the container 4. The seating sockets 58 are parallel to each other, as they are both to be disposed on the ends of parallel fork arms 90, 92.

Figure 5A:
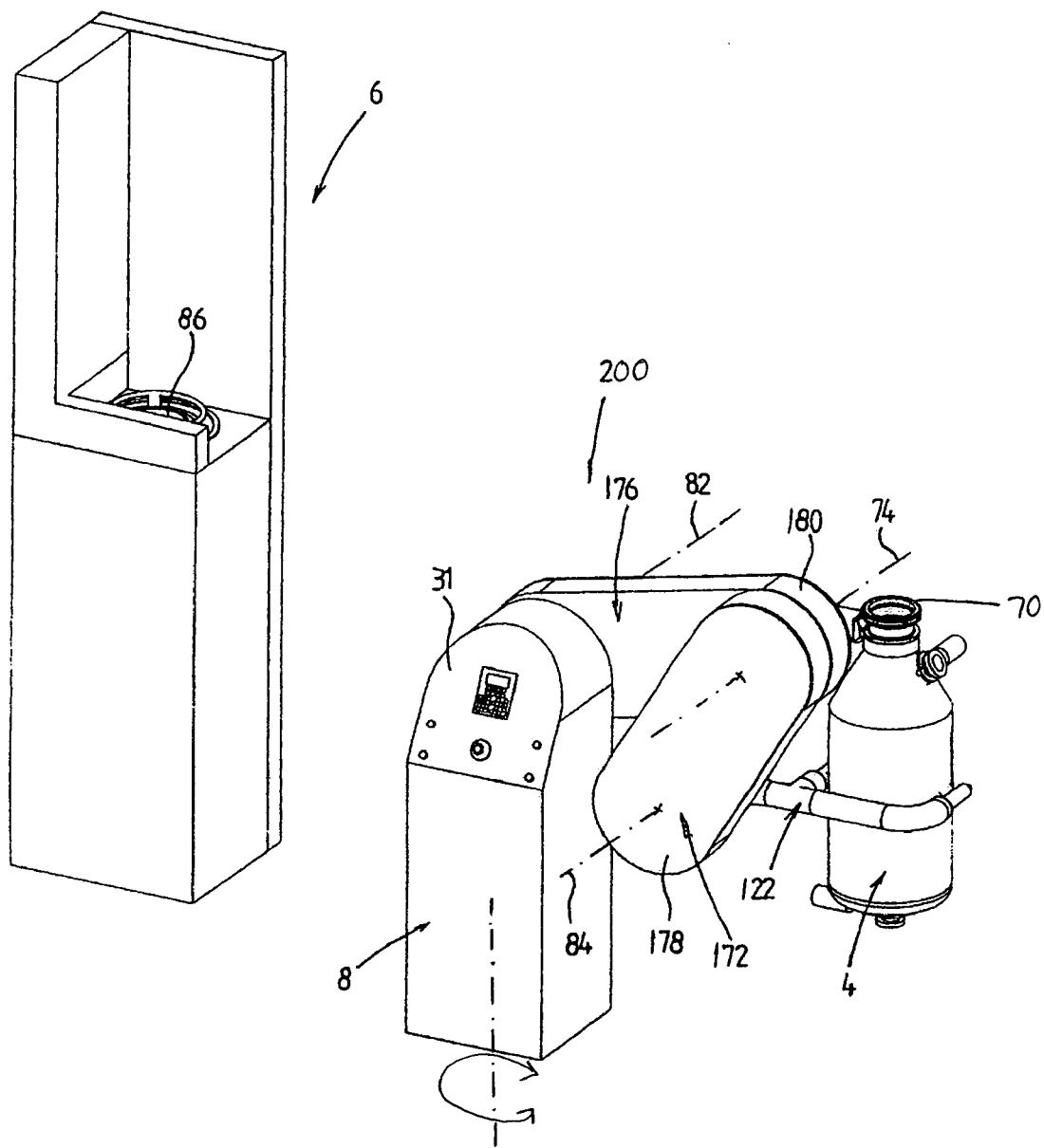
FIGS. 5a, b, and c are front, perspective views of a second embodiment of the device illustrated in FIGS. 1a-1c having two articulated arms, illustrating a container received, lifted, and rotated into an emptying station.
Figure 5B:
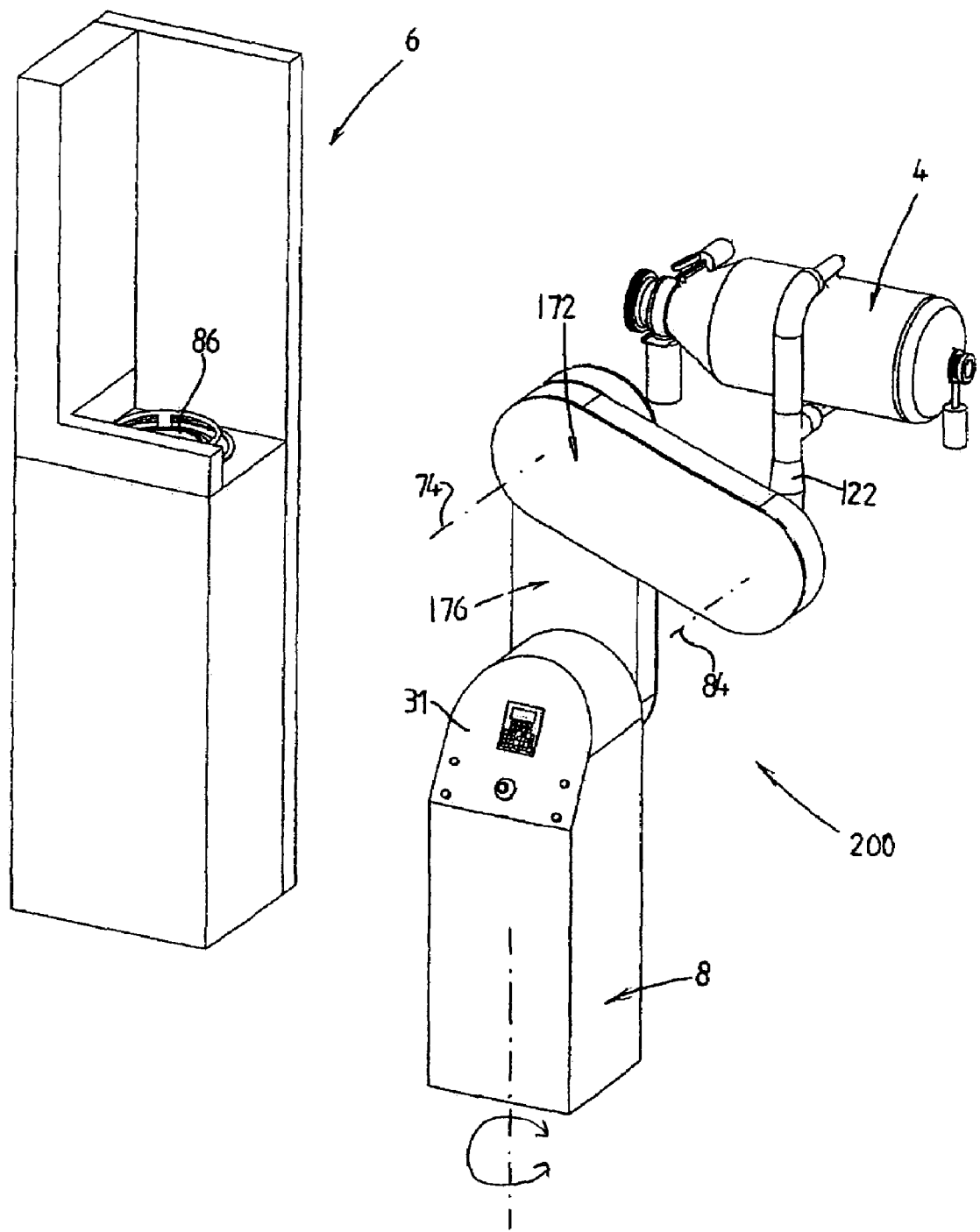
Figure 5C:
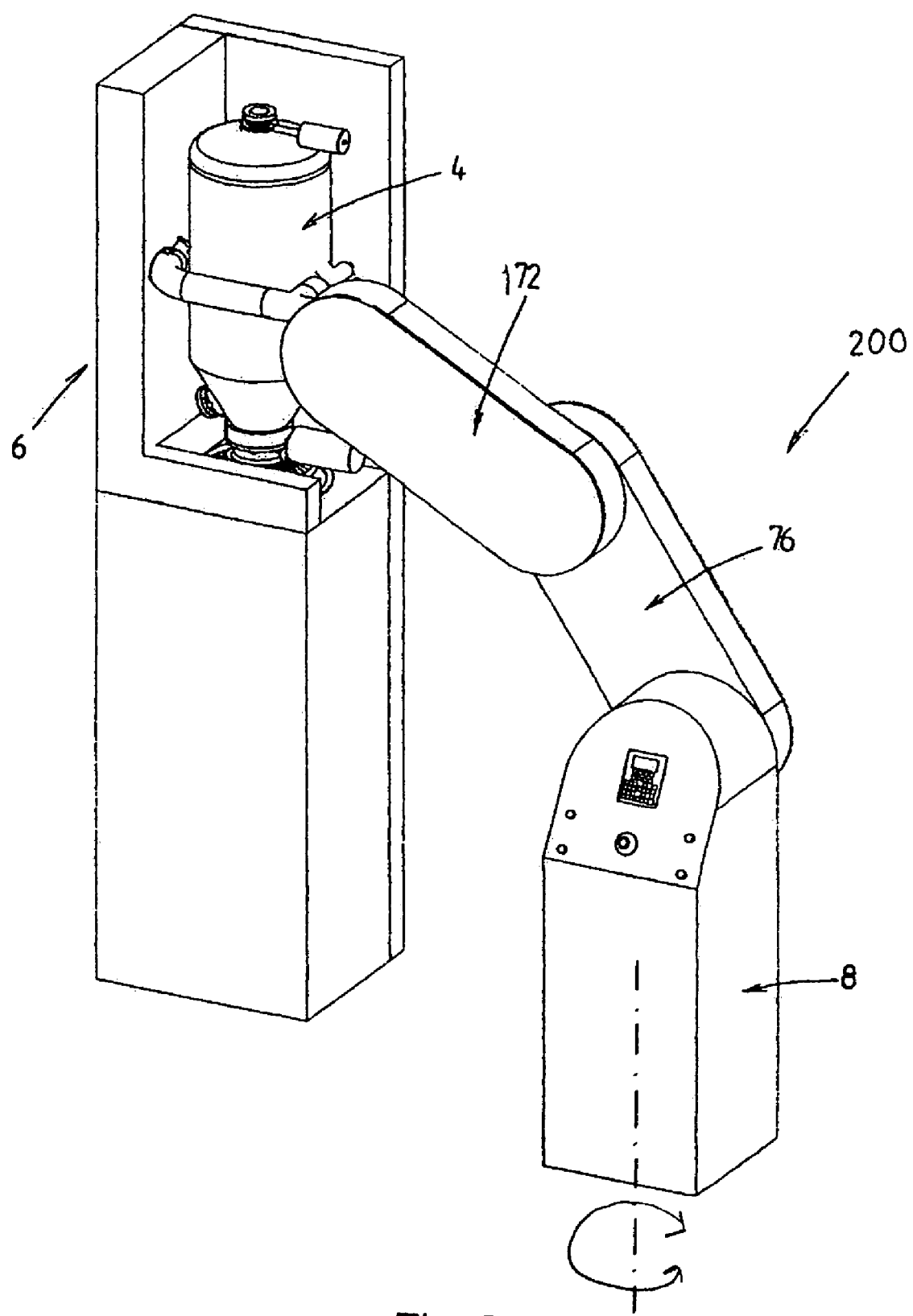

Referring to FIGS. 5a-5c, the support column 8 has a closed housing 30, the upper front end of which is tapered on one side for providing a control panel 31 for the device 2 with elements such as an input keyboard, switches, a display, or the like. The control panel 31 may be used to operate a control unit mounted inside the support column 8, to adjust the pivot path of the articulated arm 10, and to coordinate the pivoting of the articulated arm 10 with the rotation of mounting 22, 122.

Figure 4:
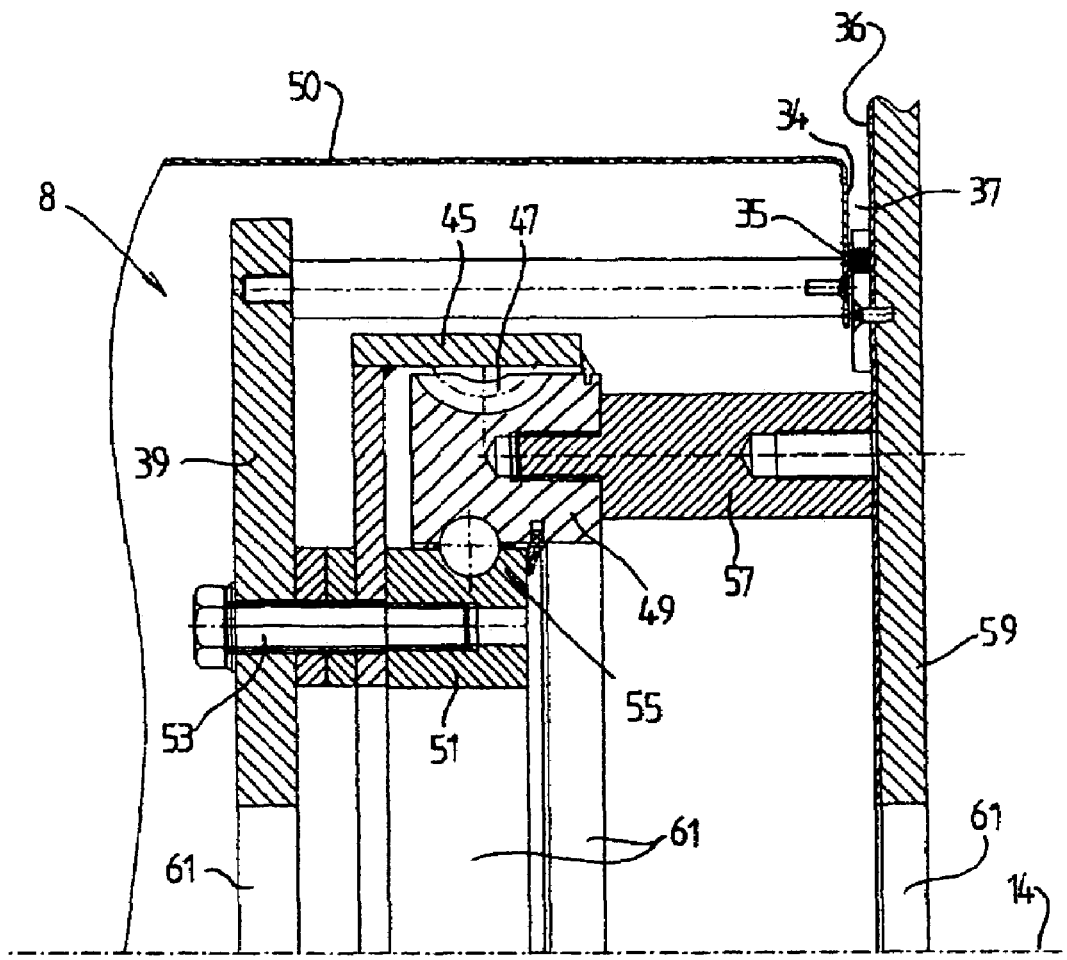
FIG. 4 is a sectional view of a part of a hinge joint between the support column and the articulated arm.

The articulated arm 10 is rotatably attached to a side of the support column 8 via a hinge joint 13, on the opposite side of the control panel 31, next to a vertical boundary wall 34. Boundary wall 34 is opposite, and a short distance, from an adjacent vertical boundary wall 36 of a closed housing 38 of the articulated arm 10. Boundary wall 34 is substantially parallel to boundary wall 36. As seen in FIG. 4, a sealing ring 35 is mounted between the opposite exteriors of the boundary walls 34, 36 and seals off a gap 37 or channel between them around the hinge joint 13.

The articulated arm 10 and the mounting 22 are pivoted by means of a motor system, or accompanying electric drive motors of the rotating drives 310, which drive the articulated arm or the mounting 20 by way of a reduction gear 41; it is expedient for a rotating drive 310 of the articulated arm 10 to be mounted inside the support column 8 and the rotating drive 63 of the mounting 22 inside the articulated arm 10, as seen in FIG. 3.

As clearly illustrated in FIG. 3, a vertical mounting plate 39 is mounted in the interior of the support column 8 enclosed by the housing 38, and atop base plate 28. The rotating drive 310 is disposed on a side of the mounting plate 39 engaging the articulated arm 10. The rotating drive 310 pivots the articulated arm 10 around horizontal pivot axis 14—in other words, around the upper surface of the support column 8.

The rotating drive 310 comprises an electric drive motor 33 connected to the flange-connected reduction gear 41. The output shaft of the reduction gear 41 carries a worm gear (not shown) of a worm gear stage 43 of the hinge joint 13 with complementary gearing 47 (FIG. 4) of a hollow gear 49. The hollow gear 49 is in the form of an outer ring of a roller bearing 55. An inner ring 51 is fastened to the vertical mounting plate 39 with a plurality of bolts 53, while the outer ring 49 is coupled to a stable mounting plate 59 inside the housing 38 of the articulated arm 10 to be nonrotatable by a ring of bolts 57. This way, the drive motor 33 pivots the articulated arm 10 either clockwise or counter-clockwise in relation to the support column 8.

The mounting plate 39, the roller bearing 55, the hollow gear 49, the ring of bolts 57, the boundary wall 36, the sealing ring 35, and the mounting plate 59 enclose a passage opening 61 coaxial with the pivot axis 14. This is how the interior members of the support column 8 and the articulated arm 10 communicate with each other. The sealing ring 35 prevents the interior members from coming into contact with the clean, sterile room environment. Mounting plates 39, 59 are nonrotatably connected to hollow gear 49 and ring bolts of 57 surrounding passage opening 61. Current and control cables (not shown) extend through the opening 61 positioned farther from the support column 8 through the interior of the articulated arm 10 to a rotating drive 63 of the mounting 22, so that no cables extend outside the housing 30, 38.

The sealing ring 35 is concentric with the axis of rotation of the hinge joint 13 which encloses the nonrotatable connection 57 between the hollow gear 49 in the interior of one component 8 and a stable mounting plate 59 in the interior of the other component 10 and, in the case of the support column 8 and the articulated arms 10, ensures sealing of the communicating interiors of adjacent parts from the clean room environment. An additional sealing ring may be added to any channel between two bodies, such as the support column 8 and the articulated arm 10 or at the location of another hinge joint where a sealing ring would secure the channel between an articulated arm 10 and the mounting 22.

The rotating drive 63 is fastened onto mounting plate 59 and engages mounting 22. Rotating drive 63 operates substantially similar to rotating drive 310, but may be of smaller mechanical dimensions. The rotating drives 310 and 63 are provided with position transmitters which transmit the respective rotated or pivoted position of the hinge joint 13 or 15, respectively, to the control unit. The mounting plate 59 is provided at both front ends 12, 20 with end switches for limiting a maximum pivot path of the articulated arm 10 or the maximum angle of rotation of the mounting 22.

Further, the mounting plate 59 bears screw mountings for securing a part of the boundary wall 36 adjacent to the support column 8 and for other boundary walls 40, 42, 44, 46 on the narrow sides and on the front ends of the housing 38 and a part of the boundary wall 48 on the wide side of the housing 38 adjacent to the boundary wall 36, which are in the form of stainless steel sheets and are bolted from the interior of the articulated arm 10 onto the mounting plate 59. As a result, there are no bolt heads or other projections on which dust or other pollutants could be deposited projecting above the smooth exterior surface of these boundary walls 36, 40, 42, 44, 46, 48.

This presents advantages, and not only from the viewpoint of potential adherence of impurities, over devices with boundary walls with flexible covers or bellows but also from that of cleaning or disinfection of these surfaces with aggressive cleaning or disinfection means. It is advantageous for any boundary walls extending upward and at least one articulated arm 10 to be partly rounded and/or for the boundary walls to be provided with smooth exterior surfaces and at least to some extent be fastened by means of magnets to avoid any projections (i.e. heads of screws or rivets) above the surface.

Figure 6:
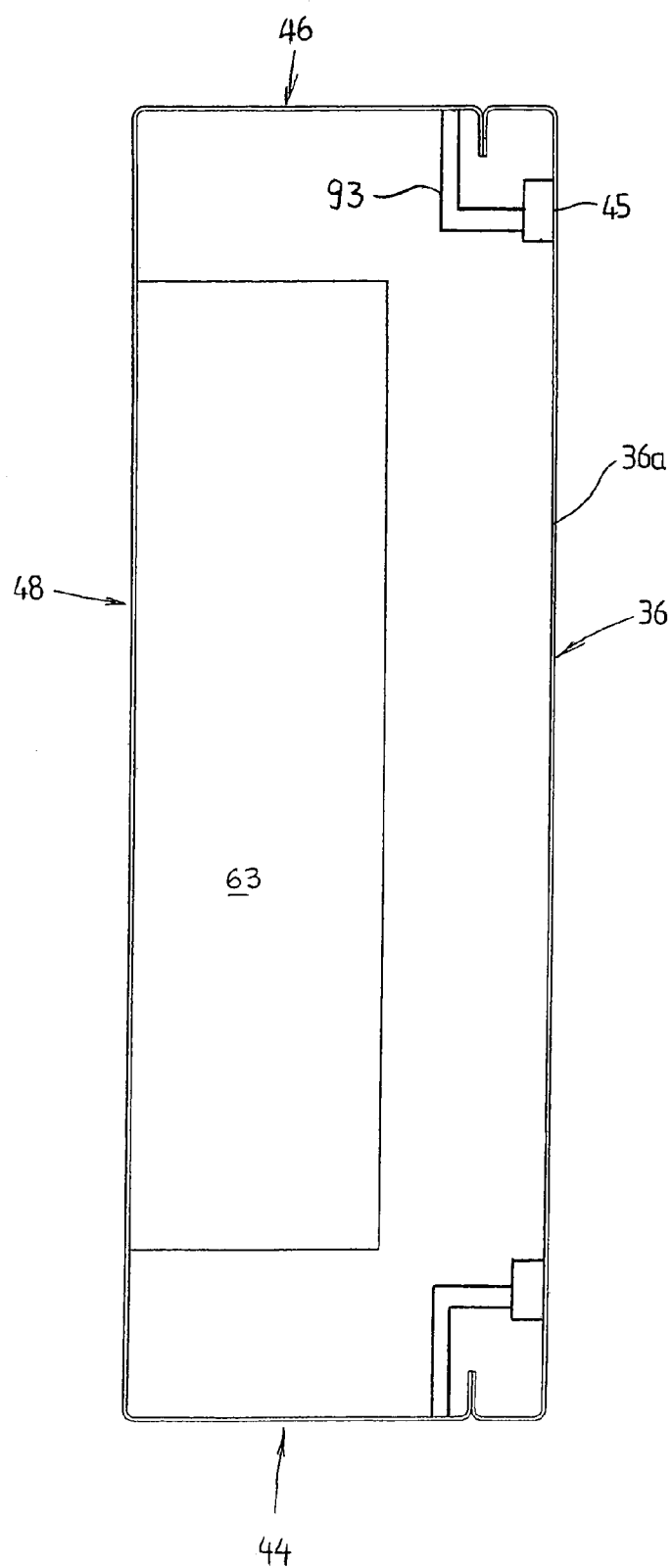
FIG. 6 is a side elevational view in cross section of an articulated arm showing magnets securing the articulated arm together.

A part of the two boundary walls 36 and 48 is detachably fastened to the wide side of the articulated arm 10 by magnets 45 and 93, as shown in FIG. 6, for a part 36a of the boundary wall 36 to provide a removable cover for closing a service or inspection opening in the boundary wall 36 by way of an assembly opening made in the mounting opening in the boundary walls 36 and 48 which provides access on the side of the support column 8 to the rotating drive 63 and to the bolt mountings positioned there and on the side of the mounting provides access to the rotating drive 63 and bolt mountings positioned there. Lastly, the joints on the edges of all boundary walls 36, 40, 42, 44, 46, 48 of the housing 38, as well as all rigid joints of the housing 30 of the support column 8, are siliconized, that is, sealed by means of an elastic joint sealant. To reduce the number of joints, the boundary walls 40, 42, 44, 46, 48, may be configured as a one-piece unit into which the mounting plate 59 may be fastened by the application of an adhesive.

The upper front end of the housing 30 of the support column 8 is provided on its upper side with a rounded boundary wall 50 which, like the rounded boundary walls 44, 46 on the front ends 12, 20 of the articulated arm 10, boundary wall 50 prevents the depositing of dust or other pollutants on its outer surface.

The mounting plate 52 has a rear side in parallel with the vertical exterior of the boundary wall 48 and is mounted a short distance from the exterior of the boundary wall 48 and connected by a ring of bolts to a hollow gear of the hinge joint 15 which is the same or similar in design as the hinge joint 13. There is also mounted between the exterior of the boundary wall 48 and the rear side of the mounting plate 52 a sealing ring which, like sealing ring 35, ensures sealing of the gap between the rear side of the mounting plate 52 and the exterior of the boundary wall 48 of the articulated arm 10.

The container 4, detachably connected to and received by mounting 22, comprises a cylindrical central component 60, a flat bottom 62, and a beveled conical top 64. The bottom 62 and the top 64 are each provided with a lockable connection 66, 68 for the introduction or removal of steam, water, or other treatment medium into container 4. The lockable connection 66, 68 is in the form of a closable valve. In addition, the top 64 is provided on its tip with a lockable opening 70 as described in detail and illustrated in EP 1 510 227 A1 or EP 0 586 307 A1, to which reference is made here for the purpose of obtaining further details. The opening 70 is best used for filling or removing the contents of container 4.

As is shown in FIGS. 1a-1c, a container 4 received in an upright position into the mounting 22 may be lifted and rotated about the horizontal axis 24 by pivoting the articulated arm 10 relative to the support column 8 in a direction corresponding to that of the articulated arm 10, into a position in which opening 70 is essentially at the same vertical height as previously but points downward. This permits the smaller objects in the container to fall from the container 4 under the force of gravity when opening 70 is released, as described and illustrated in greater detail in EP 1 510 227 A1.

As an alternative, however, the container 4 may be lifted by pivoting articulated arm 10 in one pivot direction and rotation of the mounting 22 in the opposite direction, in such a way that it always maintains its upright position, for example, for the purpose of positioning it in a suitable mounting of a transfer cart. Specifically, articulated arm 10 substantially rotates clockwise around horizontal axis 14 while mounting 22 simultaneously rotates counter-clockwise substantially the same degrees around horizontal axis 24.

Generally speaking, the orientation of the container 4 along the pivot path of the articulated arm 10 around axis 14 may be changed in any manner desired, by appropriately actuating the two rotating drives 31, 63 of the articulated arm 10 and the mounting 22.

In contrast to the device shown in FIGS. 1 to 3, in the case of the device 200 illustrated in FIGS. 5a to c, the rotatable mounting 122 is not mounted on the free end of an articulated arm 10 connected directly to the support column 8 but on the free front end 178 of a second additional articulated arm 172 which in turn may be pivoted by motor about a horizontal axis 74 on the front end 180 of the first articulated arm 176 articulated about a pivot axis 82 facing away from the support column 8.

The second articulated arm is pivotable in relation to the first articulated arm by means of an electric drive motor of a rotating drive mounted in the first articulated arm and acts on the second articulated arm through a reduction gear.

The reduction gears preferably comprise a worm gear stage, the self-locking properties of which provide for automatic locking on stopping of the pivoting or for rotation of at least one articulated arm or the mounting. It is expedient for the respective worm gear stage to have a worm gear which is meshed with complementary gearing on the outer circumference of a hollow gear which, for example, in the case of the hinge joint between the support column and articulated arm or first articulated arm, is rotatably mounted in the support column and nonrotatably connected to the articulated arm or first articulated arm. Transmission of power to the other hinge joints is effected in the same way; it is expedient for the hollow gear and the driven component such as the articulated arm or the mounting to be interconnected by a ring of screw bolts 57.

In order to facilitate sealing of the hinge joints 13,15 it is expedient for the articulated arm 10, 76 to articulate on one side of the support column 8, while an optional second articulated arm 72 is articulated on one side of the first articulated arm and the mounting 22 also projects above one side of the first or second articulated arm, their axis of rotation 74 and accordingly the pivot axis of the articulated arm 84 or the pivot axes of the articulated arms being perpendicular to these sides.

In order to facilitate seating of containers, the mounting preferably projects above the side of the first 76 or second articulated arm 72 facing away from the support column 8, while to reduce the moments acting on the support column 8, the second arm 72 is articulated on the side of the first articulated arm 76 adjacent to the support column 8.

The configuration of the articulated arm 172, the hinge joint between the two articulated arms 176 and 172, and a rotating drive for pivoting the articulated arm 172 substantially correspond to the configuration of the articulated arm 10, the hinge joint 13 between the support column 8 and the articulated arm 10, and the rotating drive 31 of the device 2 of the first exemplary embodiment. The articulated arm 172 is mounted on the adjacent wide side of the first articulated arm 176 adjacent to the support column 8 in order to minimize the torque applied to it by the container 4 and the two articulated arms 176, 172 in a plane vertical in relation to the mounting 122 and in parallel with the pivot axes 74, 82 and the axis of rotation 84 through the center of the support column 8.

As a result of operating two articulated arms 176, 172 not only may the range of the device 200 in the vertical and horizontal directions be increased but by suitable actuation of the rotating drives of the articulated arms 176, 172 of the container 4 may be moved at least in a limited area along a straight path of movement perpendicular to the axes 74, 82, 84, for example, in order to move the container 4 opening 70 pointing vertically downward to the vicinity of an opening 86 of the emptying station 6 and docking it with the latter or in order to move the container 4 horizontally above a transfer cart before being deposited on this transfer cart. As can be seen in FIGS. 5a to 5c support column 8 may be also pivotable about a vertical axis, relative to the floor 26 or the base plate 28, if the container 4 needs to be moved from its initial plane of movement.

Opening 86 is a substantially circular aperture in emptying station 6 that receives the contents of container 4. The opening 86 is provided with a rapid transfer port means such as described for example in EP 0 586 307 A1, SNE LA CALHENE. This kind or rapid transfer port means comprises a door and a doorframe. The door is interconnectable with a rapid transfer cap that seals the opening 70 of the container 4. When interlocking one side of the rapid transfer port cap of the container 4 that has been directed outwards from the container 4 and thus might have been contaminated, is locked together with the outer side of the door of the rapid transfer port means. The "double door" comprising the locked together door and cap can then be opened while any contamination is safely held between the cap and the door.

Container 4 may be moved along any path desired by actuating the rotating drives of the two articulated arms 76, 72 simultaneously or separately one after the other in the same or different directions of rotation and at the same or different speeds of rotation.

Embodiments 2 and 200 are configured so that a desired movement of the container 4 may be effected by the appropriate manual actuation of the rotating drives on the control panel 31. Both the path of movement of the container 4 and rotary movements of the mountings 22 and 122 may be stored in the control unit by means of position transmitters. The stored path of movement may be controlled by an appropriate command to the control unit which is executed automatically by the rotating drives 31, 63 of the hinge joints 13, 15, respectively by way of a frequency converter.

When a particular embodiment has been chosen to illustrate the invention, it will be understood by those skilled in the art that various changes and modifications can be made therein without departing from the scope of the invention as defined in the appended claims.

What is claimed is:

1. A device for lifting and rotating containers in a clean room environment comprising:
    a support column and a mounting for receiving a container, wherein said mounting may be moved in relation to said support column and rotated about an axis of rotation; and
    at least one articulated arm disposed between said support column and said mounting, said articulated arm being pivotable in relation to said support column about a horizontal pivot axis spaced from said axis of rotation;
    wherein said support column and said at least one articulated arm are completely encased by a plurality of boundary walls;
    wherein said boundary walls enclose a motor system wherein said motor system is sealed from a clean room environment; and
    wherein said motor system includes an electric drive motor, a reduction gear coupled to said electric drive motor, and a worm gear stage coupled to said reduction gear for rotating said articulated arm.

2. The device as claimed in claim 1, wherein
    said boundary walls are constructed of a stainless steel material.

3. The device as claimed in claim 1, wherein
    said support column and said at least one articulated arm each include a housing with smooth exterior surfaces having no projections above the surface.

4. The device as claimed in claim 1, wherein
    at least two of said boundary walls are fastened together by a plurality of magnets.

5. The device as claimed in claim 1 wherein
    a rear side of said articulated arm is disposed on said support column; and
    said mounting projects from a front side of said articulated arm facing away from said support column, wherein said sides are substantially perpendicular to said axes.

6. The device as claimed in claim 1, wherein
    said support column is secured to a floor.

* * * * *